United States Patent [19]
Tsuchihashi et al.

[11] Patent Number: 5,105,367
[45] Date of Patent: Apr. 14, 1992

[54] MASTER SLAVE MANIPULATOR SYSTEM

[75] Inventors: Akira Tsuchihashi, Nagareyama; Shinichi Takarada, Yokohama; Taro Iwamoto, Mito; Kichio Nakajima, Ibaraki; Hiroshi Yamamoto, Tsuchiura; Tatsu Aoki, Tokyo, all of Japan

[73] Assignee: Hitachi, Ltd., Tokyo, Japan

[21] Appl. No.: 421,841

[22] Filed: Oct. 16, 1989

[30] Foreign Application Priority Data

Oct. 19, 1988 [JP] Japan ............... 63-261472

[51] Int. Cl.$^5$ ............................. B25J 3/00
[52] U.S. Cl. ............................. 395/99; 901/8
[58] Field of Search .......... 901/3, 14, 15, 27, 1, 901/8; 364/513; 414/729

[56] References Cited

U.S. PATENT DOCUMENTS

| | | | |
|---|---|---|---|
| 3,923,166 | 12/1975 | Fietcher et al. | 901/8 |
| 4,046,262 | 9/1977 | Vykukal et al. | 901/1 |
| 4,068,156 | 6/1978 | Johnson et al. | 364/513 |
| 4,352,620 | 8/1982 | Inaba et al. | 701/14 |
| 4,510,574 | 4/1985 | Guittet et al. | 364/513 |
| 4,650,388 | 3/1987 | Frioux et al. | 414/729 |
| 4,661,032 | 4/1987 | Arai | 364/513 |
| 4,826,392 | 5/1989 | Hayati | 364/513 |
| 4,853,874 | 8/1989 | Iwamoto et al. | 364/513 |

Primary Examiner—Allen R. MacDonald
Assistant Examiner—George Davis
Attorney, Agent, or Firm—Antonelli, Terry, Stout & Kraus

[57] ABSTRACT

A master slave manipulator system includes a master arm having six or more axes of motion and an articulated slave arm having six or more axes of motion and being shaped in sharp contrast with the master arm. The master arm has an arm body with three axes perpendicular to each other and a wrist assembly connected to the arm body. The wrist assembly has a gripper disposed in a space of a size large enough for an operator to operate the gripper with his clutched hand in X, Y and Z directions and also has a pitch-axis, a yaw-axis and a roll-axis all disposed outside of the space. The pitch-axis, yaw-axis and roll-axis have output axes directed toward the gripper. The slave arm has an arm body with axes longitudinally stretchable or foldable into parallel positions, and a wrist assembly having three axes disposed in a space of predetermined dimensions in X, Y and Z directions. The output axes of the three axes of the slave arm wrist assembly are directed away from the mounting portions of these axes. The slave arm is so controlled as to follow movements of the master arm.

6 Claims, 12 Drawing Sheets

MASTER SLAVE MANIPULATOR SYSTEM

BACKGROUND OF THE INVENTION

1. Field of the Invention

The present invention relates to a manipulator system operated by an operator, and more particularly, to a manipulator system which enables a person to perform manual operations at a point spaced from a work site which presents an unendurable environment to him, such as space.

2. Description of the Prior Art

Control of the complicated operations of the conventional manipulators requires the skill or the ability of an operator. In the case of a master slave type manipulator, since the configuration of a master arm is the same as or analogous to that of a slave arm, the master arm may take a form which is unsuited to control by the operator, may be so large as to inhibit operation by the operator, or may be constructed such that it cannot perform delicate manual operations.

With the availability of sophisticated electronic hardware and system software during the past decade, computers are used to achieve the sophisticated control of manipulators or robots. Examples of such a manipulator system include the one described from page 40 to page 45 in IECON' 84. In this manipulator system, a master arm and a slave arm have different configurations, and high-speed coordinate transformation operations are performed by a computer to accomplish one-to-on correspondence between the motions of the master arm and those of the slave arm.

This master slave manipulator system including the arms having different configurations has advantages in that the operative range of the slave arm can be expanded, and in that the master arm can be constructed such that it matches the body of the operator, enabling the operationality of the master arm, i.e., the ease with which the master arm can be used, to be improved.

Thus, utilization of the computer in the manipulator system enables the operationality and the workability, i.e., the ability with which the system can perform work, of the system to be improved. Computers may be utilized in the manipulator system more effectively to improve the operationality and the workability of the system by examining the master/slave arm mechanism. Such research is described from page 3 to page 13 and from page 14 to page 21 in the Journal of the Japan Robots Association No. 5 Vol. 4, published in October, 1986.

However, in the above-described research, the follow-up property and the calculation time have been examined, but the ease with which the master/slave arms can be operated has not been sufficiently studied.

A master arm structure which is improved to improve the ease with which it can be operated has been made public in the literature of the Japan Robots Association. However, this technique gives no consideration to the operationality of the overall master slave manipulator system including the master arm.

Japanese Unexamined Patent Publication No. 63-22283 discloses a master arm structure which is designed to improve the ability with which manual operations can be done by the master arm. U.S. Pat. application Ser. No. 363,071 discloses a manipulator wrist with three axes intersecting at right angles.

In order to improve the ease with which the master arm of the manipulator can be operated, the orientation of a person's eyes and hands, the angle through which a wrist is bent, twisted or inclined toward or away from the person's body, and degrees of freedom and range of the motions of a arm have to be taken into consideration when the structure of a master arm is to be determined.

The structure of a slave arm is restricted by the contents of work to be done, its folding ability, and its operating range.

Singular points have also to be taken into consideration when the operationality and the workability are to be improved.

With these factors as well as the control system taken into consideration, the operationality and the workability of an integrated master slave manipulator system may be improved.

The master arm and the slave arm have both different portions and similar portions in their structures because the structure of the master arm is determined by the build of a man and the structure of the slave arm is determined by its application.

When a manipulator system incorporating a master arm and a slave arm having different dimensions and configurations is used, the motions of the master arm and those of the slave arm must be in one-to-one correspondence, requiring the provision of a coordinate transforming unit. When a small master arm is controlled to move a large slave arm in a large motion, the scale of the operation has to be enlarged. Furthermore, when the small master arm is controlled to move the large slave arm to do detailed work in various portions of the large operation range of the slave arm, the scale of the operation has to be reduced or the starting point of the operation has to be shifted.

These enlargements and reductions in the scale and shift of the starting point require a coordinate transformation supplementing unit for further transforming the data of the coordinate transforming unit. In the manipulator system incorporating a master arm and a slave arm both of which have six degrees of motion, when the rotational center of one axis of motion coincides with that of another axis of motion, control of the system becomes impossible. Such a problem involving the singular point may be solved by improving the structure of the master arm and by improving the control system of the slave arm.

The present invention is intended to solve the problems involving the ease with which the system can be operated from the viewpoint of the overall master slave manipulator system.

SUMMARY OF THE INVENTION

In view of the aforementioned problems of the prior art, an object of the present invention is to provide a master slave manipulator system which is improved in both the structure and the control system of the overall system to achieve improved operationality and workability.

A further object of the present invention is to provide a master slave manipulator system including a master arm operable in a large space by small movements caused by an operator and a slave arm controlled by a computer achieving a one-to-one correspondence between motions of the master arm and those of the slave arm.

Another object of the present invention is to provide combination of a master arm which has small-sized arm structure and a comparatively large wrist having three axes disposed around a clutched hand of an operator and a slave arm which has a long reach arm structure and is so controlled as to follow movements of the master arm.

Still another obejct of the present invention is to provide a master slave manipulator system which can void the problem of uncontrollability which otherwise occurs due to the geometric coincidence of two of six or more axes of each of the master and slave arms.

To this end, the present invention provides a master slave manipulator system which includes a master arm having six or more axes of motion, and a jointed slave arm having six or more axes of motion.

The master arm is controlled by an operator and preferably has a configuration and a size which will enable the operator to move it smoothly by the small movement of an arm and which will enable the operator to operate it uniquely so that no axis of motion thereof coincides with another axis of motion in the overall operation area.

The slave arm preferably has a size with which it can perform manual operations in a required space. The slave arm has a structure which is suited to handling a workpiece and which allows it to be carried from one place to another easily.

In order to allow the operator to use this master slave system efficiently, the system may preferably incorporate a secondary generalized coordinate transforming unit which effects a scale conversion with respect to the motion of the master arm and that of the slave arm and which shifts the starting point of the operation so that the master arm does not exceed its operation limit.

The master slave system may also incorporate the function of controlling the system so that the slave and master can both avoid the problem of the singular point.

A master slave manipulator system which is improved in its operationality and its workability will thus be provided.

DETAILED DESCRIPTION OF THE PREFERRED EMBODIMENTS

Embodiments of the present invention will be now described in detail with reference to the accompanying drawings.

Figure 5:
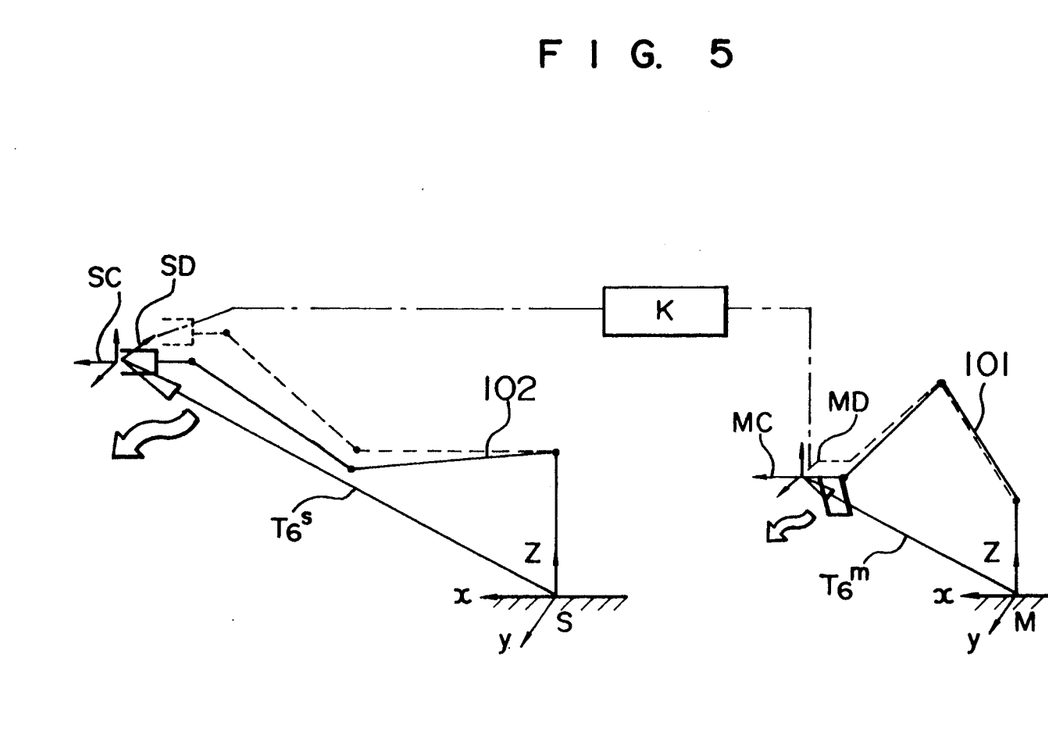
FIG. 5 explains the principle of operation of the present invention.

Before a first embodiment of the present invention is described, the principle of operation of the present invention will be described first with reference to FIG. 5. In FIG. 5, a master arm 101 and a slave arm 102 have different structures. Assuming that the standard coordinate system of the master arm 101 is M, that the coordinate transformation matrix, for the standard coordinate system M to the coordinate system of the forward end of the master arm 101 is $T_{6m}$, that the standard coordinate system of the slave arm 102 is S, that the coordinate transformation matrix from the standard coordinate system S to the coordinate system of the forward end of the slave arm 102 is $T_{6s}$, and that the scale transformation matrix between the coordinate transformation matrixes is K.

A one-to-one correspondence between the coordinate transformation matrix $T_{6s}$ and the coordinate transformation matrix $T_{6m}$ is established by arithmetic operations in which each origin of each standard coordinate system is set to a common origin.

First, the coordinate transformation matrix $T_{6m}$ is obtained from the parameters of the individual links of the master arm 101 and the positions of the rotary joints of the links. Next, the coordinate transformation operation expressed by the following equation is performed. This coordinate transformation operation contains a change in the scale between the coordinate transformation matrix $T_{6m}$ and the coordinate transformation matrix $T_{6s}$ and the shift in the starting point.

$$T_{6S} = K \cdot T_{6m} \tag{1}$$

Where $$k \begin{bmatrix} a & 0 & 0 & d \\ 0 & b & 0 & e \\ 0 & 0 & c & f \\ 0 & 0 & 0 & 1 \end{bmatrix} \tag{2}$$

when $d=e=f=0$, the value of $T_{6s}$ is a times that of $T_{6m}$ in the direction of the x axis of the standard coordinate system M of the master arm 101, b times that of $T_{6m}$ in the direction of y axis, and by x times that of $T_{6m}$ in the direction of z axis. $T_{6m}$ is enlarged uniformly in the directions of the three axes to obtain $T_{6s}$ by setting $a=b=c$.

Next, when $a=b=c=1$, $T_{6m}$ is displaced in parallel by d in the direction of x axis of the standard coordinate system M of the master arm 1, by e in the direction of y axis, and by f in the direction of z axis. From the transformation matrix $T_{6s}$ obtained by Equation (1) and the link parameters of the slave arm 102, desired values of the individual axes of the slave arm are obtained by means of the inverse coordinate transformation operation. Subsequently, the individual axes of the slave arm are servo controlled using the desired values of the individual axes thus obtained to shift the starting point of the master arm and the slave arm.

Next, an embodiment of the present invention which is operated on the basis of the aforementioned principle will be described below with reference to FIGS. 1 to 7.

Figure 2:
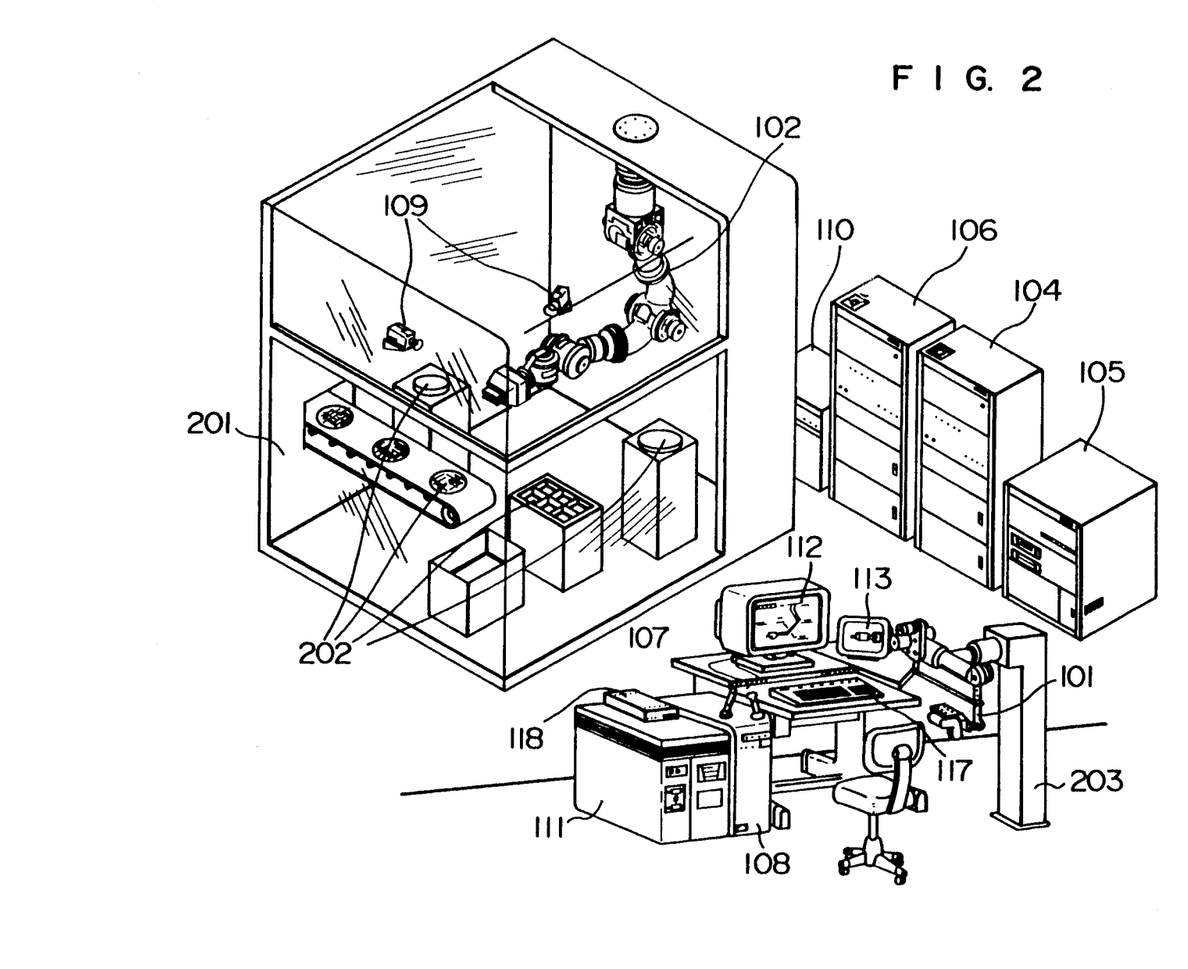
FIG. 2 is a schematic view of the system in FIG. 1.

Referring first to FIG. 2, a manipulator system includes a master arm 101 and a slave arm 102 which have different configurations, and a central processing unit 105 for processing the coordinate transformation operations and for controlling the two arms.

A coordinate transformation supplementing unit 118, which features the present invention, creates K expressed in Equation (2) on the basis of the instruction input from a keyboard and gives an instruction of supplementing the coordinate transformation expressed by Equation (1) to the central processing unit 105.

An input/output unit 104 for the master arm 101 has the function of inputting the angles of the individual joints of the master arm 101 or the like to the central processing unit 105 and of amplifying the signals which the central processing unit 105 outputs to the master arm 101 and driving the actuators of the individual joints of the master arm 101 in accordance with the signals. An input/output unit 106 for the slave arm 102 has the function of inputting the angles of the individual joints of the slave arm 102 or the like to the central processing unit 105 and of amplifying the signals which the central processing unit 105 outputs to the slave arm 102 and driving the actuators of the individual joints of the slave arm 102 in accordance with the signals.

A joy stick 107 can replace the master arm 101 and output an instruction to the slave arm 102 and an animation image to be described later on the basis of the switching-over in the central processing unit 105. An input/output unit 108 for the joystick 107 inputs the signal representing the angle of inclination of the joystick 107 or the like to the central processing unit 105, and amplifies the signal which the central processing unit 105 feeds back to the joystick 107 and drives the actuator of the joystick 107 in response to the signal.

An image input unit 109 monitors the work done by the slave arm 102 from various directions. An image processing unit 110 processes the image input by the image inputting unit 109, e.g., performs fast Fourier transform or the like on the image input by the image inputting unit 109, to perform pattern identification or the like.

An animater simulator 111 is a computer for animation which is capable of displaying a series of images of the slave arm produced by the computer graphics on a real time basis. A graphic display 112 displays the animation images produced by the animater simulator 111, the real images input by the image input unit 109 with the animation images superimposed thereon, and menus including the menu for switching over the mode. The graphic display 112 is also used to output dialogs which are carried out with a computer in the man-machine interface between the central processing unit 105 and the animation simulator 111. A TV monitor 113 displays the images obtained by the image input unit 109. A keyboard 117 is used to input the scale conversion constant and the instruction of the shift of the starting point. The keyboard 117 is also used to input dialogs which are carried on with a computer in the man-machine interface between the central processing unit 105 and the animation simulator 111.

A workpiece 202 is placed within a vacuum chamber 201. The slave arm 102 has to perform manual operations on the workpiece 201 over a wide range in the vacuum chamber 201. The master arm 101 is supported on a base 203.

Figure 1:
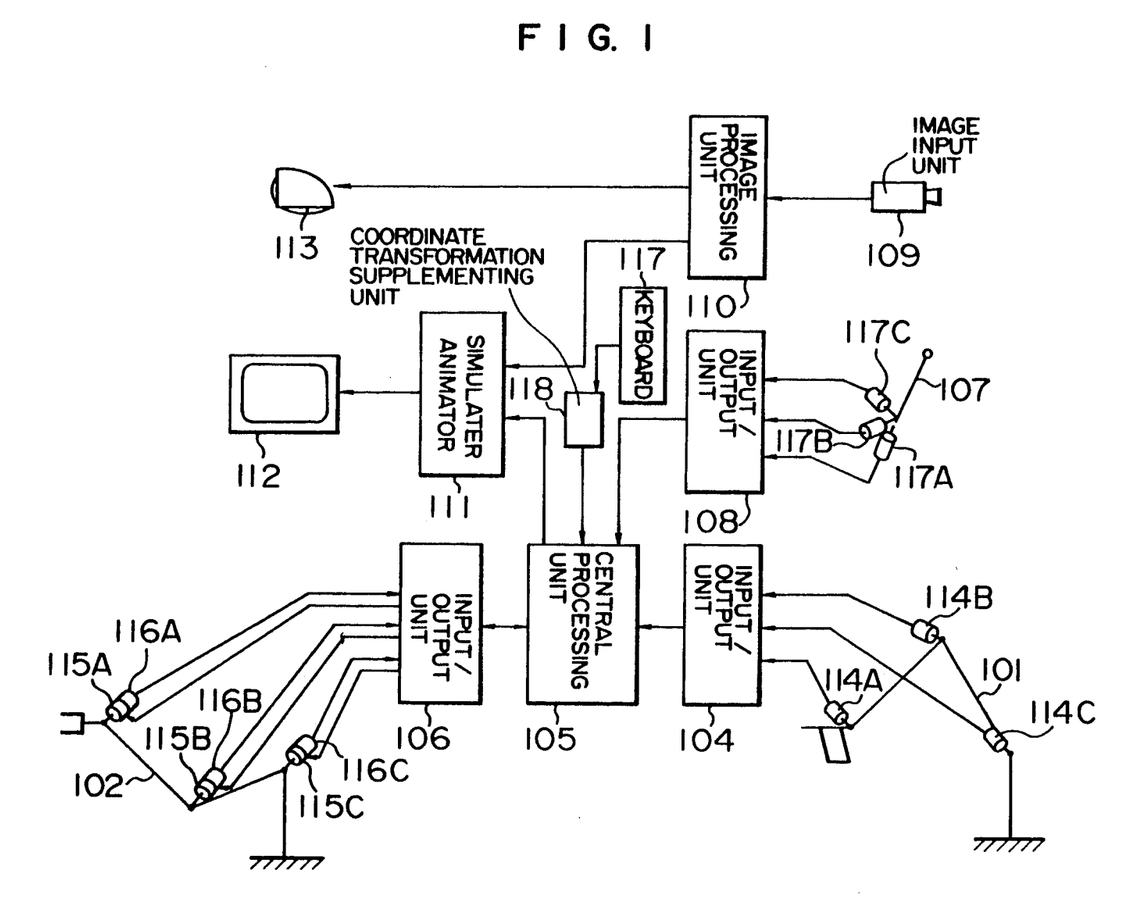
FIG. 1 is a block diagram of a master slave manipulator system including a master arm and a slave arm having different configurations.

Next, the main signal flow in this embodiment will be described with reference to, FIG. 1. In an actual master slave system, each of the master arm, the slave arm and the joystick have six degrees of freedom. However, they have 3 degrees of freedom in the following description to simplify the description.

The individual joints of the master arm 101 have their own position detection sensors 114A to 114C. The signals from these position detection sensors 114A to 114C are processed by the master arm input/output unit 104, and the resultant signals are input to the central processing unit 105. The individual joints of the slave arm 102 respectively have position detection sensors 115A to 115C. The signals from these position detection sensors 115A to 115C are processed by the slave arm input/output unit 106, and the resultant signals are input to the central processing unit 105. The central processing unit 105 determines the signals to be given to the slave arm 102 by performing the coordinate transformation operation on the signals thus obtained and then by performing the secondary coordinate transformation operation on the resultant signals on the basis of the instruction of the coordinate transformation supplementing unit 118. These signals are given to the actuators 116A to 116C provided on the individual joints of the slave arm 102 through the slave arm input/ output unit 106 to drive them. Concurrently with this, the central processing unit 105 also sends the signals to the animater simulator 111 to display the animation images of the slave arm on the graphic display 112.

The joystick 107 has position detecting sensors, 117A to 117C for detecting the angles of the joystick 107. The signals detected by these sensors are processed by the joystick input/output unit 108, and the resultant signals are input to the central processing unit 105. The central processing unit 105 determines whether it is to refer to the signal sent from the master arm or that from the joystick on the basis of an external switch-over signal when it determines the instructions to be given to the slave arm.

The image processing unit 110 performs fast Fourier transform or pattern identification on the image input by the image input unit 109, and displays the resultant real image on the TV monitor 113. At the same time, the image processing unit 110 sends the real image to the animater simulator 111, when necessary, to display it together with the animation image on the graphic display 112.

Figure 3:
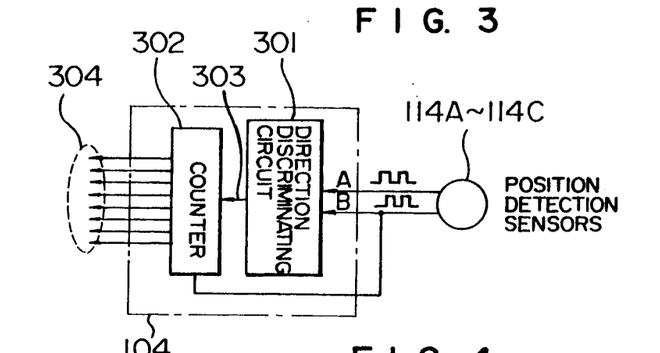
FIG. 3 shows a rotational angle detecting circuit of the system in FIG. 1.

Next, an example of the method by which the master arm input/output unit 104 processes signals from the position detecting sensors 114A to 114C will be described with reference to FIG. 3. The same method is adopted in the joystick and the slave arm. In FIG. 3, the position detection sensors 114A to 114C are each provided in the form of a rotary pulse generator which generates a pair of pulse trains which are out of phase by 90 degrees, e.g., A phase and B phase, in accordance with the angle of rotation. The pulses generated from each of the rotary pulse generators are input to the direction discriminating circuit 301 of the master arm input/output unit 104 which discriminates the direction in which the corresponding joint is rotated and outputs a direction signal 303. Either A phase or B phase of the pulses is input to a counter 302 for counting a number of pulses. The direction signal 303 output from the direction discrimination circuit 301 is also input to the counter 302 where it is used to increase or decrease the number of pulses. In consequence, the value output from the counter 302 increases or decreases in accordance with an increase or decrease in the angle of rotation. The angle of rotation can be detected by reading an output 304 of the counter 302 by an external, circuit.

Figure 4:
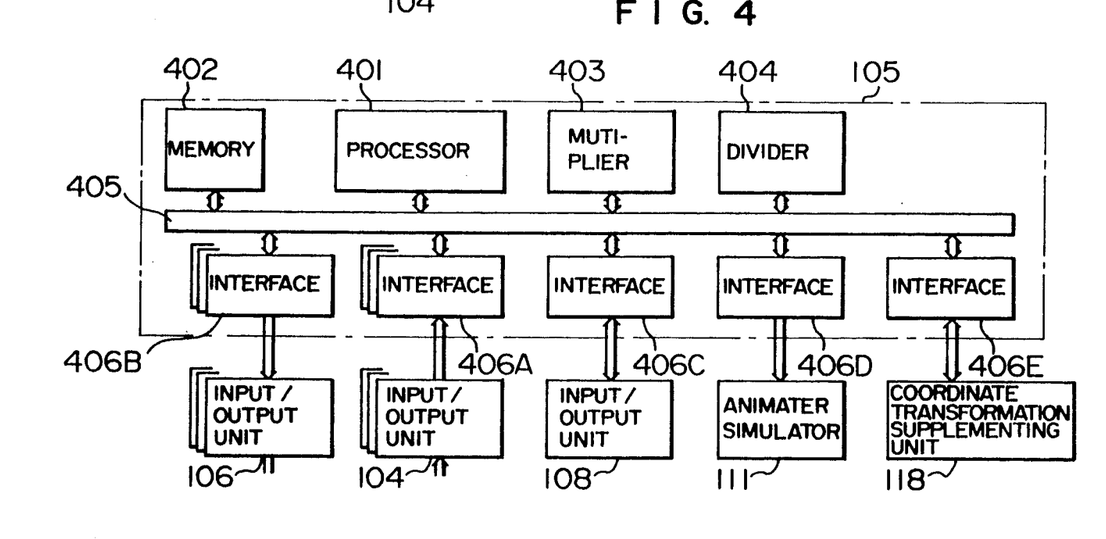
FIG. 4 shows an example of a central processing unit.

FIG. 4 shows an example of the construction of the central processing unit 105. In this example, the central processing unit 105 is constructed by a processor 401 for controlling input/output of data and for performing various operations, a memory 402 for storing data representing a list of trigonometric functions, link parameters of the manipulator and so on, a multiplier 403, a divider 404, a bus 405 for connecting these components with each other, and serial or parallel interfaces 406A to 406E connected to the bus 405. The interfaces 406A to 406E are also connected to the individual input/output units, the animater simulator and the coordinate transform supplementing unit, respectively. The processor 401 is accessible to all the components connected to the bus 405 through the bus 405 to process data.

Next, the operation of the embodiment of the present invention arranged in the above-described manner will be described below:

Once the master arm 101 is operated, the rotation angles of the individual joints of the master arm 101 are detected by the position detection sensors 114A to 114C. The detection signals are input to the central processing unit 105 through the master arm input/output unit 104. The central processing unit 105 performs the generalized coordinate transform operation on the detection signals to obtain the coordinate transformation matrix $T_{6m}$ which represents the orientation of the coordinate system MC of the forward end of the master arm 101 to the standard coordinate system M of the master arm. The coordinate transformation supplementing unit 118 gives an instruction for supplementing the coordinate transform to the central processing unit 105 on the basis of the instruction input from the keyboard 117 using the matrix K stored in the coordinate transformation supplementing unit 118. The matrix K represents the ratio of the motion of the forward end of the slave arm 102 to the motion of the forward end of the master arm 101, i.e., the scale conversion constant, as well as the shift of the starting point of the forward end of the master arm 101 and the starting point of the forward end of the slave arm 102. Upon receipt of the instruction from the coordinate supplementing unit 118, the central processing unit 105 performs an operation in which the master arm coordinate transform matrix $T_{6m}$ is multiplied by K to obtain the slave arm coordinate transform matrix $T_{6s}$. Next, the desired values of the individual joints of the slave arms 102 when the position of the coordinate system SC of the forward end of the slave arm 102 relative to the standard coordinate system S of the slave arm is identical with the slave arm coordinate transform matrix $T_{6s}$ are obtained by the inverse coordinate transform operation. The resultant desired values are output to the slave arm input/output unit 106, which drives the actuators 116A to 116C. Thus, the motion of the forward end of the master arm 101 can be automatically duplicated by the forward end of the slave arm 102 with a change in the scale and/or a shift of the starting points. As a result, the motion of the master arm 101 can be reproduced by the slave arm 102 in an enlarged or reduced arbitrary scale regardless of the configuration of the arms, enabling an operator who operates the master arm 101 to move the slave arm 102 in small or rough motions in the operation range of the arms.

Furthermore, the starting point of the operation of the master and slave arms 101 and 102 can be freely reset in the manner described below: First, the central processing unit 105 temporarily disconnects the slave arm 102 from the master arm 101 by the instruction of the coordinate transform supplementing unit 118 which is based on an instruction input from the keyboard 117. While the slave arm 102 is stationary, the operator shifts only the master arm 101 to an arbitrary position. Next, the coordinate transform supplementing unit 118 updates d, e, and f in Equation (2) by this shift between the master arm 101 and the slave arm 102. Thereafter, the master arm 101 is connected to the slave arm 102 again by the instruction input from the keyboard 117. This allows the operator to always move the master arm 101 at a position which is convenient to the operator.

Next, the construction of the master arm 101 and the slave arm 102 shown in FIG. 2 will be described in detail.

Because the structure of the master arm 102 and that of the arm or wrist of a person have a close relation, orientation of the master arm 101 to the person will be described first.

To simplify the explanation, it is assumed in the following description that the master arm 101 is operated by a right hand.

Figure 6:
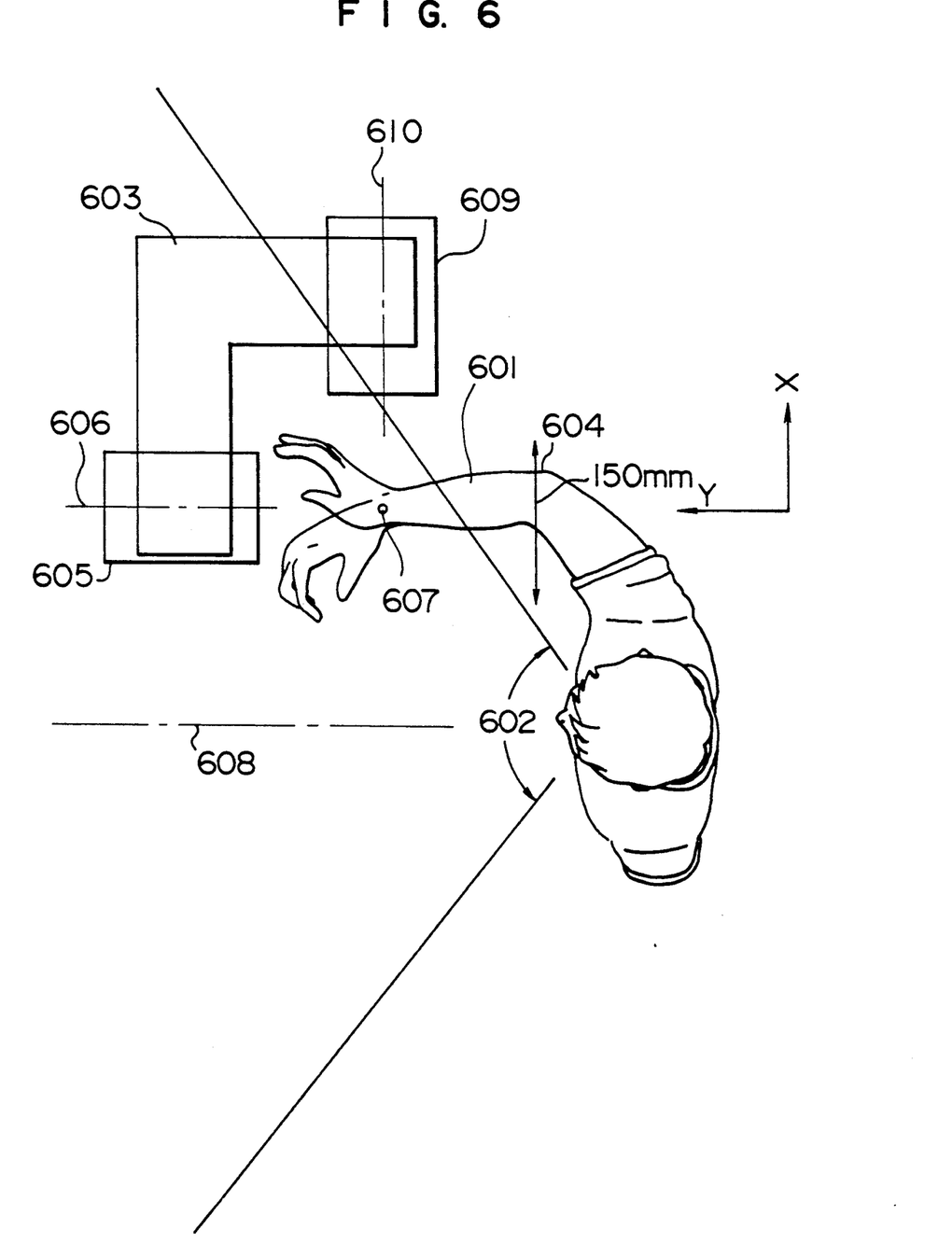
FIG. 6 is an upper view, explaining the orientation of a person to a master arm.

FIG. 6 is a view of a person as seen when looking from above. The field of vision of the person may not be blocked, if the master arm is positioned at the rear of the right hand as viewed from the eyes. That is, location of the master arm at a position 603 is preferable.

For a lengthy operation, the operator should preferably move only his or her forearm. It is thus preferable for a central axis 606 of an X-axis unit 605 which is associated with the motion of the master arm in the direction of the X axis to be located in front of the right hand and on an extension of the center of the right arm 601 and the center of a wrist 607.

It is easier to move the wrist 607 toward a center line 608 of the body than in the opposite direction, as shown in FIG. 6. This may allow the center axis 606 to shift toward the center line 608 by about 50 mm.

Furthermore, it is preferable for a center axis 610 of a Y axis unit 609 which is associated with the motion of the master arm in the direction of Y axis to be located in the vicinity of the center of the wrist 607 of the person who extends his right arm 601 comfortably.

More specifically, the master arm 101 is located at the position 603 at which the center axis 606 of the X-axis unit 605 is substantially aligned with the center of the right arm 601 and the center axis 610 of the Y axis unit 609 is aligned with the center of the wrist 607 of the person who extends the right arm 601 comfortably. That is, the master arm 101 is constructed such that it surrounds the right arm 601 and is installed at a position which surrounds the wrist 607.

Figure 7:
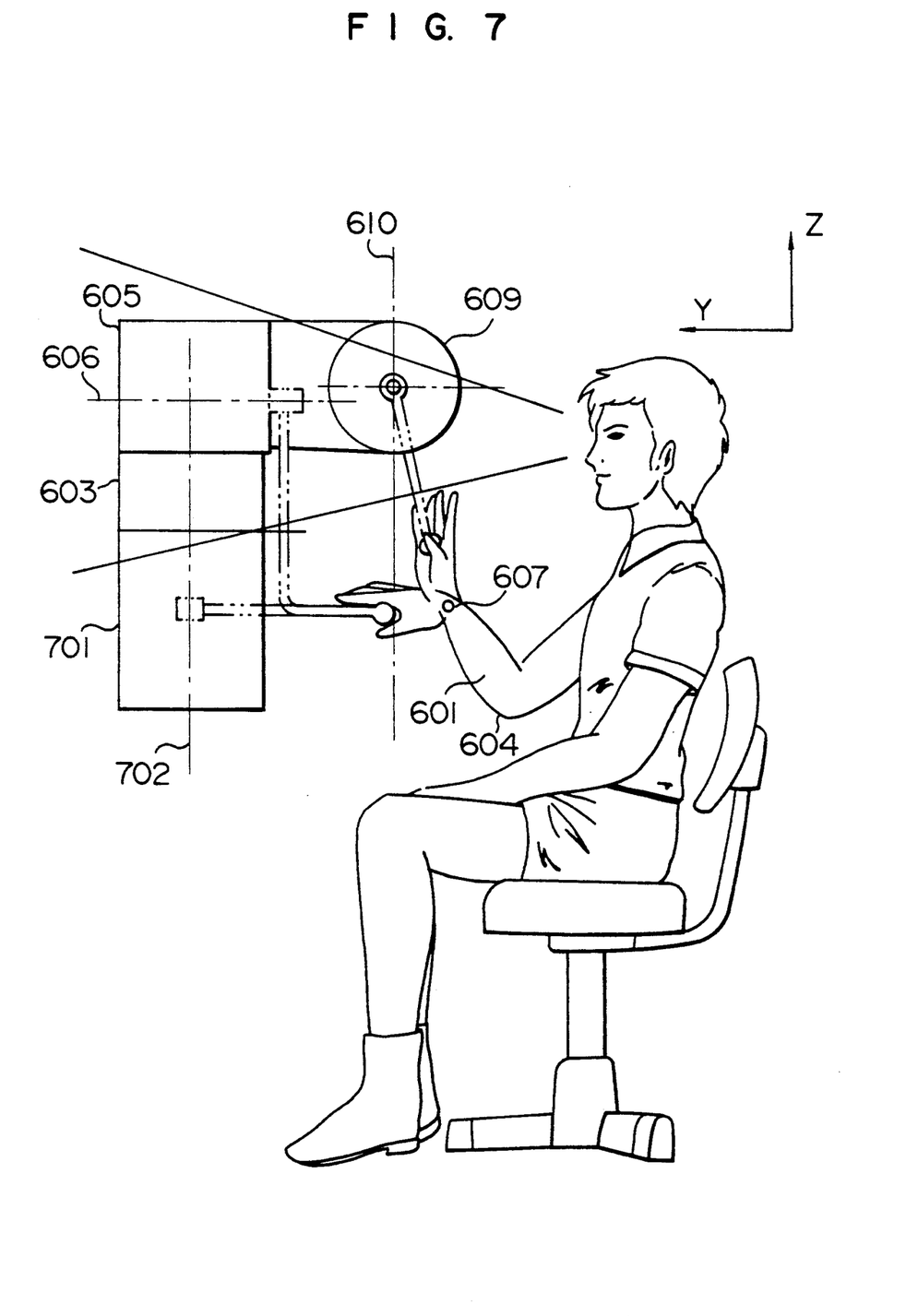
FIG. 7 is a side view of FIG. 6.

FIG. 7 shows the arrangement shown in FIG. 6 as seen when looking sideways.

In the layout shown in FIG. 7, the x-axis unit 605 associated with the motion of the master arm 101 installed at the position 603 in the direction of the x axis (in the direction perpendicular to the surface of the paper in FIG. 7) is provided higher than the right arm 601. If the x-axis unit 605 is constructed by a rotary device which rotates about the center axis 606, it may be operated only by moving the wrist 607 in the direction perpendicular to the surface of the paper (in the direction of the x axis) without moving the elbow 604. If the x-axis unit 605 is a translation unit, the elbow 604 has to be moved, causing the operator to get tired when he moves his elbow 604 for a long time through the distance exceeding 100 mm. The operator may be able to operate the translation unit most easily when the gap between the body and the elbow is about 50 mm. The operator has to tilt his body when the gap exceeds 100 mm.

Similarly, the Y-axis unit 609 which is associated with, the motion of the master arm in the direction of the Y axis is located higher than the right arm 601. If the Y-axis unit 609 is constructed by a rotary unit which rotates about the center axis 610, the operator may be able to move his wrist 607 in the direction of Y axis by moving his or her elbow 604 through a small distance. If the Y-axis unit 609 is a translation unit, the upper limit of the distance of the movement is about 120 mm for a lengthy operation.

Although the X-axis unit 605 and the Y-axis unit 609 are provided higher than the right arm 601 in the layout shown in FIG. 7, they may be provided lower than the right arm. In that case, the X and Y axes units 605 and 609 are operated in a similar manner by moving the wrist 607 in the opposite direction.

The X-axis unit 605 may be replaced by a swivel unit 701 shown in FIG. 7. In that case, the swivel unit 701 is rotatable about an axis 702.

The lever indicated by the dot-dot-dashed line in FIG. 7 is a virtual lever used to impart a torque. In an actual master arm structure, however, six articulations are mounted in sequence between the base 203 and the forward end, as shown in FIG. 2.

Examples of the master arm which are based on the examinations shown in FIGS. 6 and 7 will be described below with reference to FIGS. 8 to 11.

Figure 8:
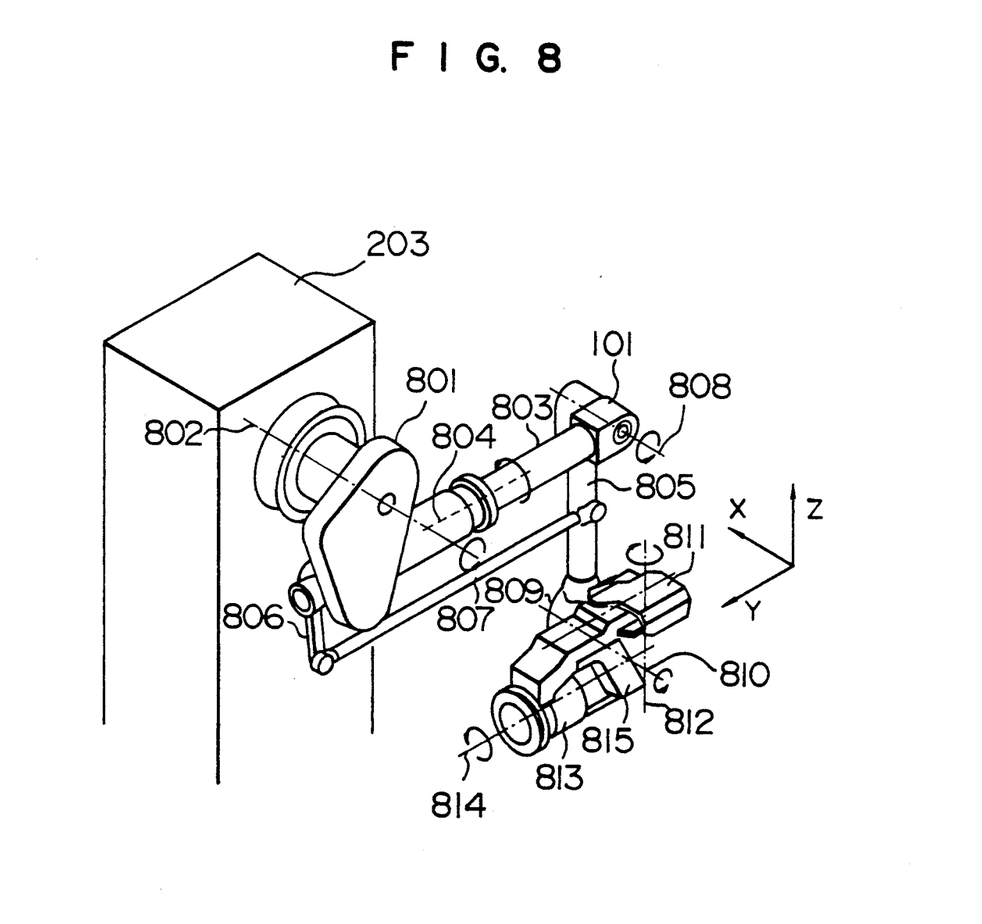
FIGS. 8, 9, 10 and 11 show examples of the master arm.

FIG. 8 shows the master arm 101 shown in FIG. 2 in detail. The master arm 101 has a base 203. A first axis 801 of the master arm 101 is rotatable about a center axis 802 thereof. Rotation of the first axis 801 causes the remainder of the master arm 101 to rotate about the center axis 802. A second axis 803 is rotatable about a center axis 804 thereof. Rotation of the second axis 803 causes the entirety of the master arm 101 to rotate about the center axis 804. An arm 805 is supported by a link 806 and a rod 807, and is rotatable about a rotary axis 808. Rotation of the arm 805 causes the forward end portion to rotate about the rotary axis 808. A pitch-axis 809 is rotatable about a center axis 810 thereof. A yaw-axis 811 is rotatable about a center axis 812 thereof. Rotation of a roll-axis 813 causes a gripper 815 to rotate about a center axis 814 of the roll-axis 813.

When the operator operates the master arm 101, he or she orients himself or herself to the master arm in the manner shown in FIG. 6, and grips the gripper 815 by his or her right hand.

The x-axis unit 605 shown in FIG. 6 is exemplified by the second axis 803 shown in FIG. 8, while the center axis 606 corresponds to the center axis 804 in FIG. 8.

The Y-axis unit 609 for moving the master arm in the direction of the Y axis is exemplified by the arm 805 shown in FIG. 8, and the center axis 610 corresponds to the center axis 808.

The motion in the direction of the Z axis is achieved by the rotation of the first axis 801 about the center axis 802. If a translation unit is used to move the master arm in the direction of the Z axis, to operate it by the operator's right arm 601 may be very inconvenient for the operator. He or she may have to move his or her body even when the distance of the movement is about 50 mm. It is therefore preferable for a rotary unit to be employed.

The entire structure shown in FIG. 8 is located as at 603 so as to obstruct the field of 602, much, as vision shown in FIG. 6.

A wrist assembly consisting of the pitch-axis 809, the yaw-axis 811 and the roll-axis 813 is designed with a person's wrist structure taken into consideration. Since the person twists his wrist about the forearm while fixing his elbow, the center axis 814 of the roll-axis 813 is aligned with the center of the gripper 815 and the elbow 604.

The person swings his or her wrist toward or away from his or her heart (with the thumb being located on top of other fingers) while fixing his or her arm. In consequence, the center axis 812 of the yaw-axis 811 intersects the center axis 814 at a position closer to the person than the gripper 815 so that the intersection coincides with the joint of the person's wrist.

It is hard for the person to keep swinging his or her wrist in the vertical direction in a state where the thumb is located on top of the finger. If he twists his wrist from the above-described position and extends his hand with the thumb located on the innermost side, he can easily bend his wrist vertically. However, this position of the wrist does not persist.

Generally, when the wrist is bent in the vertical direction, the elbow is also bent. In consequence, the center axis 810 of the pitch-axis 809 lies at a position higher than that of the center axis 814 by about 100 mm. In this way, the pitch-axis can match the person's wrist.

Figure 9:
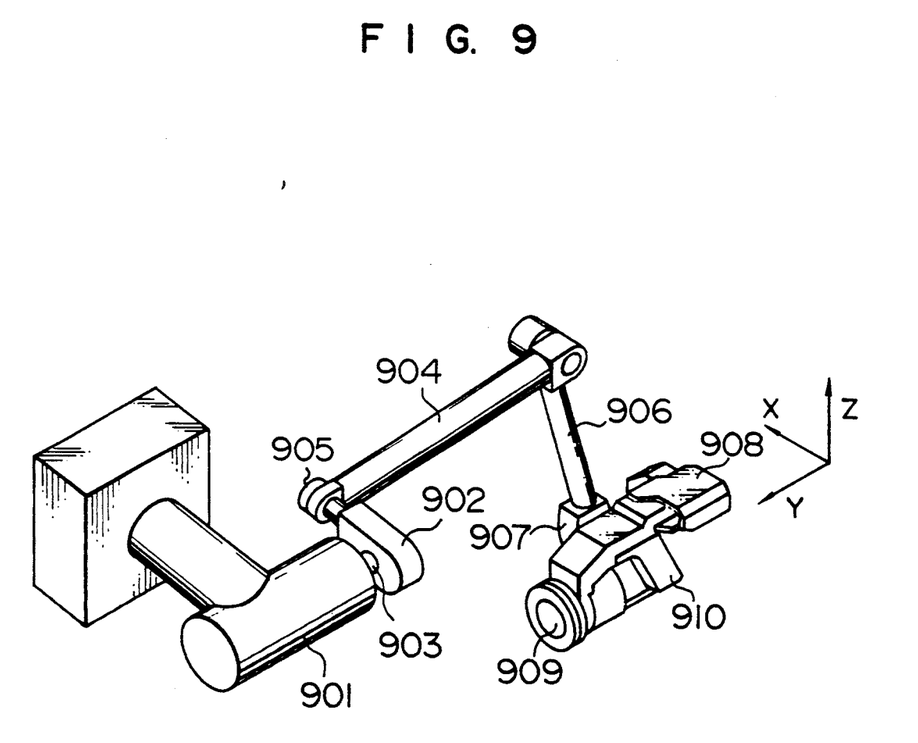

FIG. 9 shows another example of the master arm 101. A swivel axis 902 is rotatable about a center axis 903 thereof. Rotation of the swivel axis 902 causes the entire master arm to rotate about the axis 903. A first arm 904 is rotatable about a forward end of the swivel axis 905. Rotation of the first arm 904 causes the entire master arm to rotate about the forward end 905 of the swivel axis 902. A second arm 906 is rotatable about the forward end of the first arm 904. A pitch-axis 907 is capable of bending the entire wrist assemble in the vertical direction. A yaw-axis 908 is supported on the output portion of the pitch-axis 907. The yaw-axis 908 is capable of swinging the forward end portion of the wrist assembly rightward and leftward. A roll-axis 909 is capable of rotating a gripper 910.

When the operator operates the master arm shown in FIG. 9, he or she orients himself or herself to the master arm in the manner shown in FIG. 6 and grips the gripper 910, as in the case of the operation of the master arm 101 shown in FIG. 8.

The swivel axis 902 and the center axis 903 in FIG. 9 correspond to the x-axis unit 605 shown in FIG. 6, while the second arm 906 corresponds to the y-axis unit 609.

The entire structure of the master arm shown in FIG. 9 is located outside of the area 603 and the field of vision shown in FIG. 6.

The wrist assembly consisting of the pitch-axis 907, the yaw-axis 908, and the roll-axis 909 is designed with the structure of the person's wrist taken into consideration. However, it has the same structure as that of the wrist assembly shown in FIG. 8, description being therefore omitted.

Figure 10:
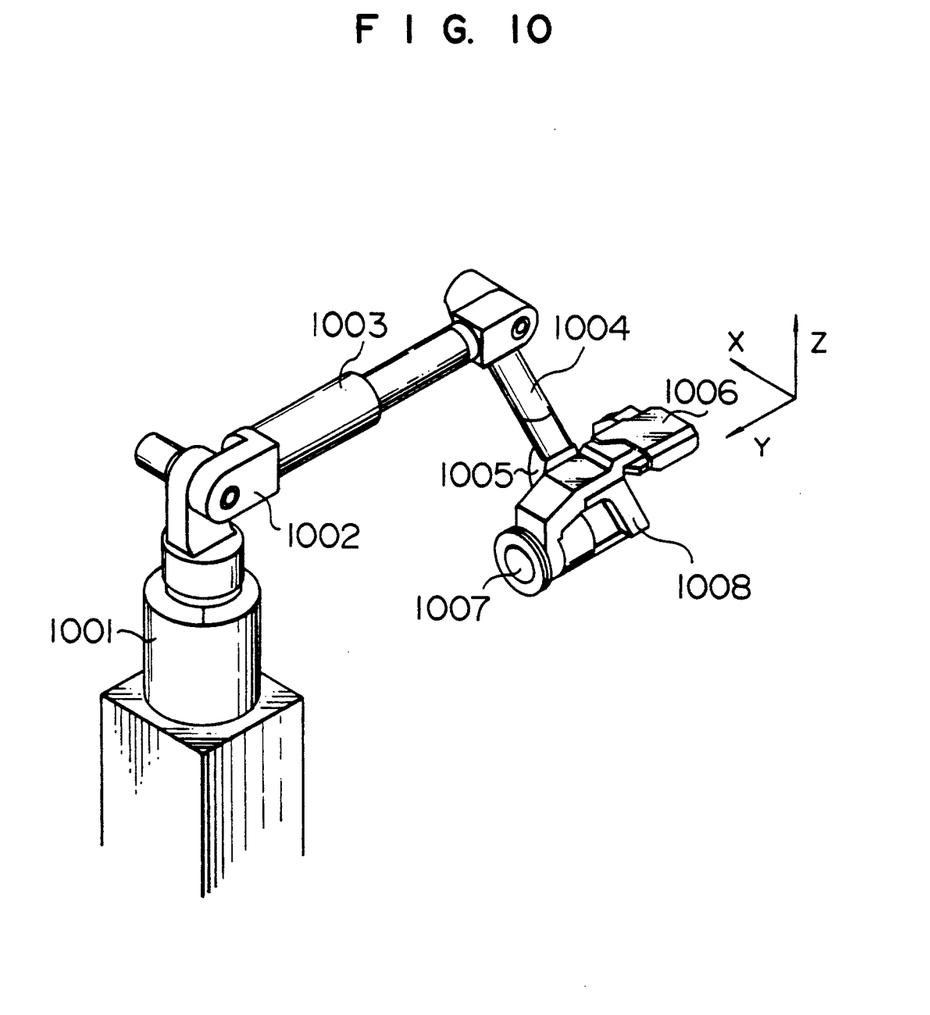

FIG. 10 shows another example of the master arm.

This master arm includes a rotary table 1001, a swivel axis 1002 for rotating the overall master arm about a vertical axis, a first arm 1003 which is rotatable in a vertical plane, a second arm 1004 which is rotatable in a vertical plane, a pitch-axis 1005, a yaw-axis 1006, a roll-axis 1007, and a gripper 1008. The functions of these members and the articulations are the same as those of the master arm shown in FIGS. 8 and 9, the description therefore being omitted.

Figure 11:
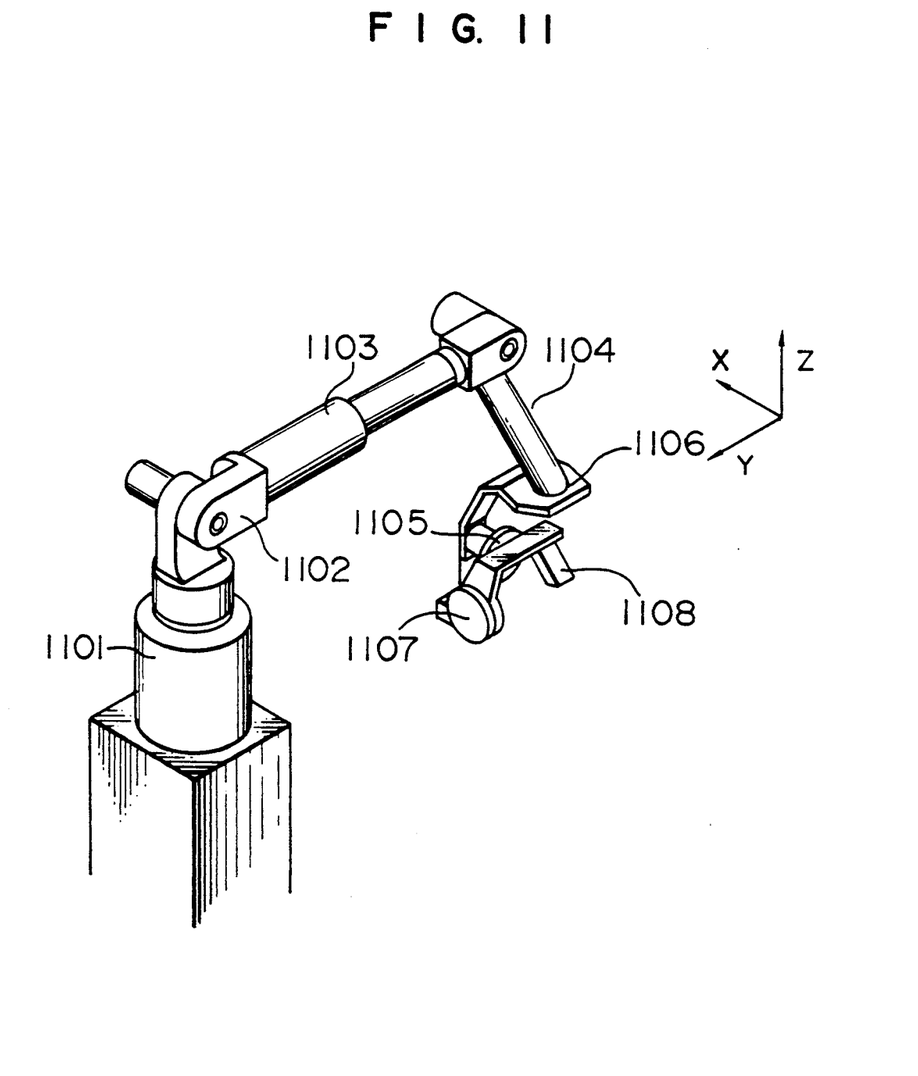

FIG. 11 shows another example of the master arm.

The master arm includes a rotary table 1101, a swivel axis 1102 for rotating the overall master arm about a vertical axis, a first arm 1103 which is rotatable in a vertical plane, a second arm 1104 which is rotatable in a vertical plane, a pitch-axis 1105, a yaw-axis 1106, a roll- axis 1107, and a gripper 1108. The functions of these members and the articulations are the same as those of the master arm shown in FIGS. 8 and 9, the description therefore being omitted.

When the master arms shown in FIGS. 10 and 11 are operated, the operator orients himself or herself to the master arm 101 in the manner shown in FIG. 6 and grips the gripper 1008 or 1108, as in the case of the master arm 101 shown in FIG. 8.

The swing axes 1002 and 1102 in the master arms shown in FIG. 10 and 11 correspond to the swing unit 701 shown in FIG. 7 having the same function as that of the x-axis unit 605 shown in FIG. 6.

The second arms 1004 and 1104 correspond to the Y-axis unit 609 shown in FIG. 6.

The overall master arms shown in FIGS. 10 and 11 are located outside of the area and the field of vision shown in FIG. 6 or 7.

As will be apparent from the above description, the fundamental concept of the master arm structures shown in FIGS. 6 and 7 is the same throughout the examples shown in FIGS. 8 to 11, though the structure may differ.

It is, however, to be noted that in the case of the master arm shown in FIG. 9, a special operation state (a singular point) may exist, where the center axis of the swivel axis 902 and that of the roll-axis 909 coincide with each other.

In that state, the operator may be unable to separate the motion of the swivel axis 902 and that of the roll-axis 909. This inconvenience may be avoided by restricting the motion of the master arm 101 such that the center axis of the swivel axis 902 does not coincide with that of the roll-axis 909.

Next, the structure of the slave arm will be described. As stated above with reference to FIG. 5, the slave arm 102 is controlled using the desired values of the individual axes which are calculated on the basis of the operation of the master arm 101. Since the operation of the desired values and control of the slave arm are performed by the central processing unit 105, the problem involving the singular point in the master arm structure shown in FIG. 9 may be solved by controlling the slave arm 102 such that it does not approach the singular point or by providing an algorithm in which the slave arm does not pass the singular point.

When the structure of the slave arm is to be considered, the operation angle of the individual axes thereof should be made large so as to allow the slave arm to reach as far as possible in the vacuum chamber 201 shown in FIG. 2.

The slave arm should also be constructed such that it can be readily folded, because it is installed within the vacuum chamber 201.

Figure 12A:
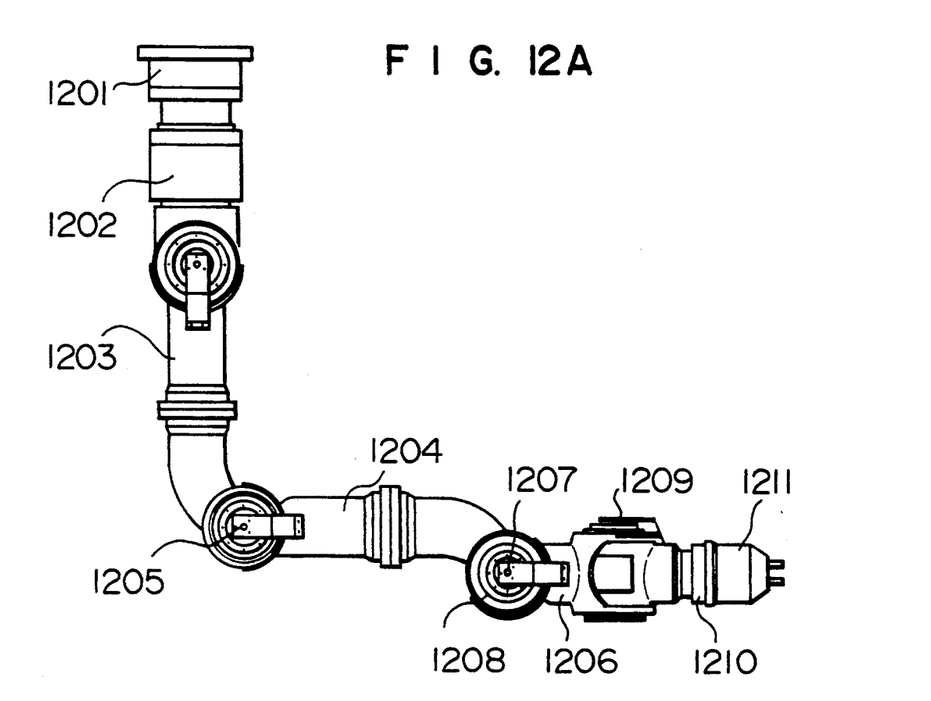
FIGS. 12 and 13 show examples of a slave arm.

FIG. 12A shows one example of the slave arm.

This slave arm includes a support base 1201, a swivel axis 1202 which is rotatable relative to the base 1201 a first arm 1203 which is rotatable about the forward end portion of the swivel axis 1202, a second arm 1204 which is rotatable about a forward end portion 1205 of the first arm 1203, and a wrist assembly 1206 consisting of a pitch-axis 1208, a yaw-axis 1209, a roll-axis 1210, the pitch-axis 1208, the yaw-axis 1209 and the roll-axis 1210 being mounted on a forward end portion 1207 of the second arm 1204 in that order, and a hand 1211 mounted on the forward end portion of the roll-axis 1210.

Figure 12B:
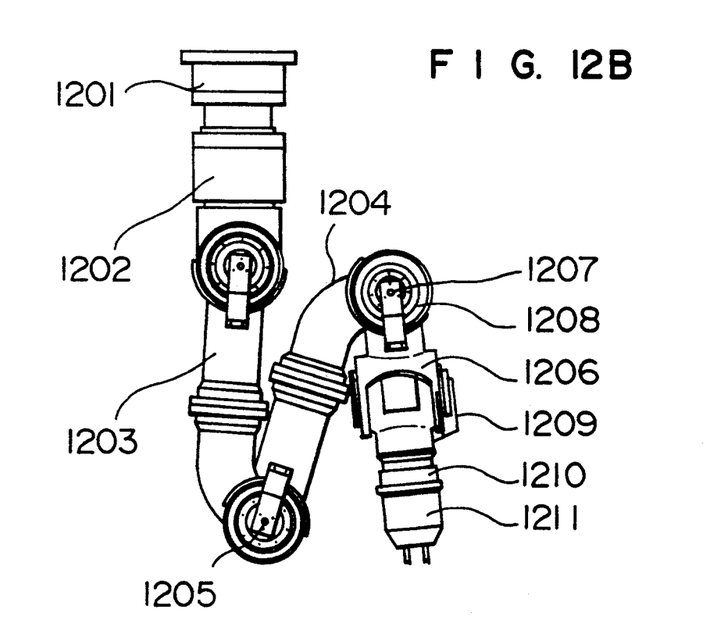

Both the forward end portion 1205 of the first arm 1203 and the forward end portion 1207 of the second arm 1204 are placed off the center line of the first arm 1203 and that of the second arm 1204 so as to facilitate the folding of the slave arm in the manner shown in FIG. 12B.

The slave arm 102 is constructed such that the hand mounted on the forward end thereof can go away from the support base 1201 and reach a large area, whereas the master arm 101 is designed such that a large number of degrees of freedom thereof can be concentrated within a limited area by disposing the roll-axis 813 and the gripper 815 mounted on the forward end of the master arm 101 closer to the base 203, as shown in FIG. 8.

Figure 13:
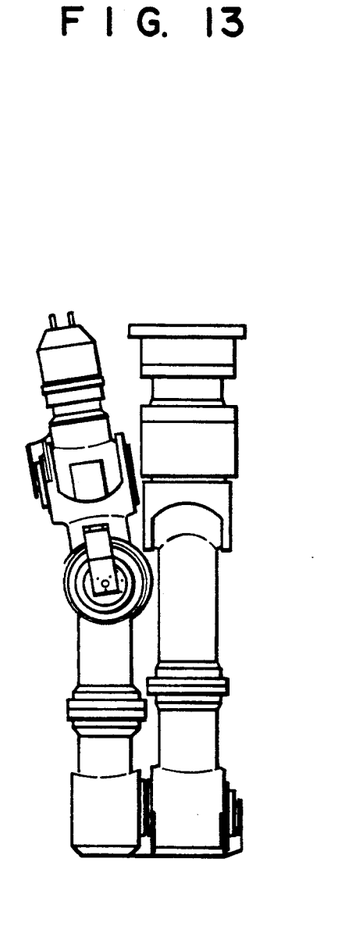

The slave arm 102 may also be constructed such that the center line of the first arm and that of the second arm are parallel, as shown in FIG. 13, to improve the folding ability thereof.

For the purpose of concentrating the degrees of freedom of the master arm 101 on the limited area, in the master arm 101 shown in FIG. 8, the center axis of the yaw-axis 811 intersects the center axis of the roll-axis 813, and the gripper 815 is located in the vicinity of the intersection. The center axis of the pitch-axis 809 is directed toward the gripper 815. In other words, the pitch-axis 809, the yaw-axis 811 and the roll-axis 813 which constitute the wrist assembly are located such that they surround the gripper 815. Furthermore, although the overall second axis 803 is rotated when the motion of the first axis 801 is transmitted thereto, the arm 805 cannot be aligned and is not required to be aligned with the arm 803, unlike the first and second arms 1203 and 1204 of the slave arm shown in FIG. 12. The arms 803 and 805 are disposed perpendicular to each other so that different motions can be allotted to them, i.e., the arms have a compact structure and are located near the person's wrist, whereas enlargement of the range of the operation is emphasized in the design of the slave arm.

The master arm structure shown in FIGS. 9, 10 and 11 has the same characteristics as those of the master arm shown in FIG. 8.

Turning back to the slave arm, the wrist assembly should be made as small as possible so as to allow the work to be done to an object easily, as in the case of industrial robots, whereas the wrist assembly of the master arm may be made large to some extent so as to facilitate the grip of the gripper by the operator and to allow the pitch-axis, the yaw-axis and the roll-axis to be disposed around the gripper.

The wrist assembly of the slave arm may be made small by disposing the roll-axis on the side of the wrist assembly closer to the arm which has a substantially axially symmetrical structure, as in the case of a person's wrist. Actually, the roll-axis and the arm are coupled with each other in many industrial robots.

The operator may be able to operate the master slave manipulator more easily by controlling six degrees of freedom separately than by controlling them all at once. In the case of the slave arm in which the roll-axis is located at the forward end thereof, the roll-axis can be operated independently without affecting the other axes after the forward end of the slave arm has been positioned and the yaw-axis and the pitch-axis have then been rotated. However, in the case of the slave arm in which the yaw-axis and the pitch-axis are located at the forward end thereof, the operation of the roll-axis and the operations of the yaw-axis and pitch-axis cannot be separated because the operation of the roll-axis changes the position of the forward end of the slave arm.

In consequence, the roll-axis of the slave arm should be disposed at the forward end thereof, even though it may contribute to an increase in the dimension of the wrist assembly.

A hanging type slave arm which hangs from the ceiling or wall of the vacuum chamber, as shown in FIG. 2, allows the narrow floor area of the vacuum chamber to be utilized effectively.

The slave arm has a support base which is far smaller than that of the master arm or industrial robot so as to facilitate the installation and conveyance thereof.

On the other hand, the industrial robots installed on the floor or the master arm shown in FIG. 10 require a large floor area for installation, and have a heavy support base. The first arm is mounted at a position as high as the waist of the person for the convenience of the operation.

As stated above, even in the case of the manipulator system which employs a master arm and a slave arm having different configurations which suit their own tasks, the optimal construction should be considered from the viewpoint of the overall master slave manipulator system.

To combine the configurations of the two arms to form one control system is not just enough to accomplish the optimal configuration.

As will be understood from the foregoing description, according to the present invention, the master arm has a structure which allows a person to operate the slave arm effectively, i.e., which enables a person to operate the slave arm easily mainly with the movement of his or her wrist without a swing of his or her arm in an exaggerated fashion. Furthermore, the slave arm is capable of reaching an object located farthest from the support base by utilizing its longitudinal dimension effectively. The slave arm can be folded in its longitudinal direction when it is carried from one place to another.

Furthermore, since the master arm has a configuration which is suited to the person's operation and the slave arm has a configuration different from that of the master arm so as to allow the limited length of the arm to be utilized effectively, the resultant master slave system can be operated in a wide range, while exhibiting excellent operationality, owing to the coordinate transformation carried out by the computer.

In order to achieve the master arm having a configuration which is suited to the person's operation, the structure of the person's body and securing of the field of vision of the person have to be taken into consideration, while the respective articulations of the master arm should be located in the vicinity of the person so as to enable the master arm to be operated by a small amount of force.

In short, in the master slave system according to the present invention, the structure and control thereof are constructed from the viewpoint of the overall system so as to improve its operability and to facilitate installation and conveyance.

What is claimed is:

1. A master slave manipulator system including a master arm having six or more axes of motion, an articulated slave arm having six or more axes of motion, and a hand connected to an end of said slave arm, wherein:

(a) said master arm has an arm body and a wrist assembly connected to said arm body;

(b) said wrist assembly includes a gripper disposed in a space of a size large enough for an operator to operate said gripper with his clutched hand in X, Y and Z directions, said wrist assembly further including a pitch-axis, a yaw-axis and a roll-axis all disposed outside of said space, said pitch-axis, said yaw-axis, and said roll-axis having output axes directed toward said gripper;

(c) said slave arm has a wrist assembly including a pitch axis, a yaw-axis and a roll-axis all accommodated within a space having predetermined dimensions in at least two of X, Y and Z directions, said pitch-axis, yaw-axis and roll-axis of said slave arm wrist assembly having mounting portions output axes directed, respectively, away from said mounting portions; and (d) means for controlling said hand so as to follow movements of said gripper.

2. A master slave manipulator system according to claim 1, wherein a supporting portion of said roll-axis of said master arm is disposed away from an end of said arm body, and wherein the output axis of said roll-axis of said master arm is directed toward said end of said arm body.

3. A master slave manipulator system according to claim 1, wherein a supporting portion of said yaw-axis of said master arm is disposed away from and perpendicular to an end of said arm body, and wherein the output axis of said yaw-axis of said master arm is directed toward said end of said arm body.

4. A master slave manipulator system according to claim 1, wherein a supporting portion of said pitch-axis of said master arm is disposed away from an end of said arm body, and wherein the output axis of said pitch-axis of said master arm is directed toward said end of said arm body.

5. A master slave manipulator, system including a master arm having six or more axes of motion, and an articulated slave arm having six or more axes of motion, wherein;

(a) said slave arm has an arm body and a tip, said arm body having axes and constructed such that said axes of said arm body can be aligned with each other in their longitudinal directions so as to expand the reach at said tip of said slave arm, and such that at least two axes of said arm body can be disposed in parallel to each other so as to reduce the overall dimension of said arm body;

(b) said master arm has an arm body and a tip, said arm body of said master arm having three axes and being constructed such that said three axes of said arm body of said master arm are perpendicular to each other so as to allow movements caused by an operator to be easily separated into movements in three directions; and (c) means for controlling said tip of said slave arm so as to follow movements of said tip of said master arm.

6. A master slave manipulator system according to claim 5, wherein the dimension between a base of said master arm and the end of said arm body of said master arm remote from said base is so small as to be within the range of the movements of an operator's arm in three directions.

* * * * *